US012665527B2

(12) United States Patent
Ogiso

(10) Patent No.: US 12,665,527 B2
(45) Date of Patent: Jun. 23, 2026

(54) MEMBER FOR SEMICONDUCTOR MANUFACTURING APPARATUS

(71) Applicant: NGK INSULATORS, LTD., Nagoya-City (JP)

(72) Inventor: Yusuke Ogiso, Nagakute-City (JP)

(73) Assignee: NGK INSULATORS, LTD., Nagoya (JP)

( * ) Notice: Subject to any disclaimer, the term of this patent is extended or adjusted under 35 U.S.C. 154(b) by 353 days.

(21) Appl. No.: 18/467,882

(22) Filed: Sep. 15, 2023

(65) Prior Publication Data

US 2024/0007023 A1    Jan. 4, 2024

Related U.S. Application Data

(63) Continuation of application No. PCT/JP2022/038413, filed on Oct. 14, 2022.

(30) Foreign Application Priority Data

Mar. 30, 2022    (JP) ................................. 2022-055112

(51) Int. Cl.
*H02N 13/00* (2006.01)
*B23K 26/352* (2014.01)
(Continued)

(52) U.S. Cl.
CPC ........... *H02N 13/00* (2013.01); *B23K 26/352* (2015.10); *C04B 35/581* (2013.01);
(Continued)

(58) Field of Classification Search
CPC ........... H01L 21/67103; H01L 21/6833; H01L 21/6831; H05B 3/143
(Continued)

(56) References Cited

U.S. PATENT DOCUMENTS

| | | | | |
|---|---|---|---|---|
| 6,861,165 B2 * | 3/2005 | Hiramatsu | .......... | C04B 35/5607 |
| | | | | 428/323 |
| 7,341,969 B2 * | 3/2008 | Natsuhara | .............. | H05B 3/143 |
| | | | | 501/98.4 |

(Continued)

FOREIGN PATENT DOCUMENTS

| | | |
|---|---|---|
| JP | 2001-313260 A | 11/2001 |
| JP | 2006-064992 A | 3/2006 |

(Continued)

OTHER PUBLICATIONS

JP-6960260-B2—English Translation (Year: 2021).*

(Continued)

*Primary Examiner* — Jason L Vaughan

(74) *Attorney, Agent, or Firm* — Muncy, Geissler, Olds & Lowe, P.C.

(57) ABSTRACT

A member for semiconductor manufacturing apparatus of the present invention includes an AlN ceramic substrate with a surface provided with projections for wafer placement. At least part of an area, provided with no projection, of the AlN ceramic substrate has a surface layer region from the surface to a predetermined depth, and a base material region below the surface layer region. The predetermined depth is 5 μm or less. The oxygen content rate of the surface layer region is higher than the oxygen content rate of the base material region.

9 Claims, 6 Drawing Sheets

(51) Int. Cl.
| | |
|---|---|
| *C04B 35/581* | (2006.01) |
| *C04B 41/00* | (2006.01) |
| *C04B 41/53* | (2006.01) |

(52) U.S. Cl.
CPC ...... *C04B 41/0036* (2013.01); *C04B 41/5346* (2013.01); *C04B 2235/3225* (2013.01); *C04B 2235/3865* (2013.01)

(58) Field of Classification Search
USPC ........................................ 219/444.1; 118/725
See application file for complete search history.

(56) References Cited

U.S. PATENT DOCUMENTS

| | | | | |
|---|---|---|---|---|
| 7,553,787 | B2 * | 6/2009 | Yoshikawa | ......... H01L 21/6831 501/98.4 |
| 10,631,370 | B2 * | 4/2020 | Nagai | ...................... H05B 3/06 |
| 11,325,866 | B2 * | 5/2022 | Naruse | ................... C09K 11/64 |
| 11,600,510 | B2 * | 3/2023 | Ito | ........................ H01L 21/6833 |
| 12,020,956 | B2 * | 6/2024 | Lal | .................... H01L 21/68757 |
| 12,174,220 | B2 * | 12/2024 | Tega | .................. G01R 1/06761 |
| 2019/0115244 | A1 | 4/2019 | Inoue | |
| 2020/0350186 | A1 * | 11/2020 | Lal | ....................... H05B 3/0047 |

FOREIGN PATENT DOCUMENTS

| | | |
|---|---|---|
| JP | 2012-119378 A | 6/2012 |
| JP | 6960260 B2 | 11/2021 |
| WO | 2017/170738 A1 | 10/2017 |

OTHER PUBLICATIONS

JP-2012119378-A—English Translation (Year: 2012).*
English translation of the International Preliminary Report on Patentability (Chapter I) dated Oct. 10, 2024 (Application No. PCT/JP2022/038413).
International Search Report and Written Opinion (Application No. PCT/2022/038413) dated Dec. 27, 2022 (6 pages).
Korean Office Action (with English translation) dated May 28, 2025 (Application No. 10-2023-7031558).
Japanese Office Action (with English translation) dated Sep. 30, 2025 (Application No. 2023-556747).

* cited by examiner

Fig. 4A

Polishing Material

Laser
15

MEMBER FOR SEMICONDUCTOR MANUFACTURING APPARATUS

BACKGROUND OF THE INVENTION

1. Field of the Invention

The present invention relates to a member for semiconductor manufacturing apparatus.

2. Description of the Related Art

As a member for semiconductor manufacturing apparatus, a conventional member includes an AlN ceramic substrate having a surface provided with a large number of small projections, and a resistance heating element embedded in the AlN ceramic substrate. A wafer is placed on the surface of the AlN ceramic substrate in contact with the large number of small projections. It is necessary to avoid mixing of impurities into the wafer placed on the AlN ceramic substrate as much as possible. In consideration of this point, PTL 1 proposes that the lateral surfaces of the small projections be provided with linearly extending multiple laser marks. In this manner, particles are prevented from occurring due to removal of crystal particles from the small projections.

CITATION LIST

Patent Literature

PTL 1: JP 6960260 B

SUMMARY OF THE INVENTION

However, in PTL 1, the linearly extending laser marks on the lateral surfaces of the small projections are so-called dross (part of a material which is once melted and solidified), thus the dross may cause the occurrence of particles. The present invention has been devised to solve such a problem, and it is a main object to effectively prevent the occurrence of particles.

[1] A member for semiconductor manufacturing apparatus of the present invention, includes an AlN ceramic substrate with a surface provided with projections for wafer placement. At least part of an area, provided with no projection, of the AlN ceramic substrate has a surface layer region from the surface to a predetermined depth, and a base material region below the surface layer region, the predetermined depth is 5 μm or less, and an oxygen content rate of the surface layer region is higher than an oxygen content rate of the base material region.

In the member for semiconductor manufacturing apparatus, the oxygen content rate of the surface layer region is higher than the oxygen content rate of the base material region. For this reason, the surface layer region provided in at least part of an area, provided with no projection, of the surface of the AlN ceramic substrate is harder than the base material region. Thus, when a wafer is processed, the occurrence of particles can be effectively prevented.

[2] In the above-described member for semiconductor manufacturing apparatus (the member for semiconductor manufacturing apparatus, according to [1]), an oxygen content rate of the surface layer region is preferably higher than or equal to 2.0 times an oxygen content rate of the base material region.

[3] In the above-described member for semiconductor manufacturing apparatus (the member for semiconductor manufacturing apparatus, according to [1] or [2]), the surface layer region is preferably blackened. In this manner, the surface layer region is likely to absorb heat, thus radiation heat is likely to be released. Consequently, a uniform wafer temperature is likely to be obtained.

[4] In the above-described member for semiconductor manufacturing apparatus (the member for semiconductor manufacturing apparatus, according to any one of [1] to [3]), dross is preferably not present in the surface layer region. In this manner, dross which may cause the occurrence of particles is not present, thus the occurrence of particles can be prevented more effectively.

[5] In the above-described member for semiconductor manufacturing apparatus (the member for semiconductor manufacturing apparatus, according to any one of [1] to [4]), a mass ratio O/N of the surface layer region preferably has a value higher than a mass ratio O/N of the base material region.

[6] In the above-described member for semiconductor manufacturing apparatus (the member for semiconductor manufacturing apparatus, according to [5]), the mass ratio O/N of the surface layer region is preferably higher than or equal to 2.2 times the mass ratio O/N of the base material region.

[7] In the above-described member for semiconductor manufacturing apparatus (the member for semiconductor manufacturing apparatus, according to any one of [1] to [6]), a mass ratio Al/N of the surface layer region preferably has a value higher than a mass ratio Al/N of the base material region.

[8] In the above-described member for semiconductor manufacturing apparatus (the member for semiconductor manufacturing apparatus, according to any one of [1] to [7]), the area, provided with no projection, of the AlN ceramic substrate may have the surface layer region and the base material region.

BRIEF DESCRIPTION OF THE DRAWINGS

FIGS. 4A to 4C are manufacturing process diagrams for the AlN heater 10.

DETAILED DESCRIPTION OF THE INVENTION

Figure 1:
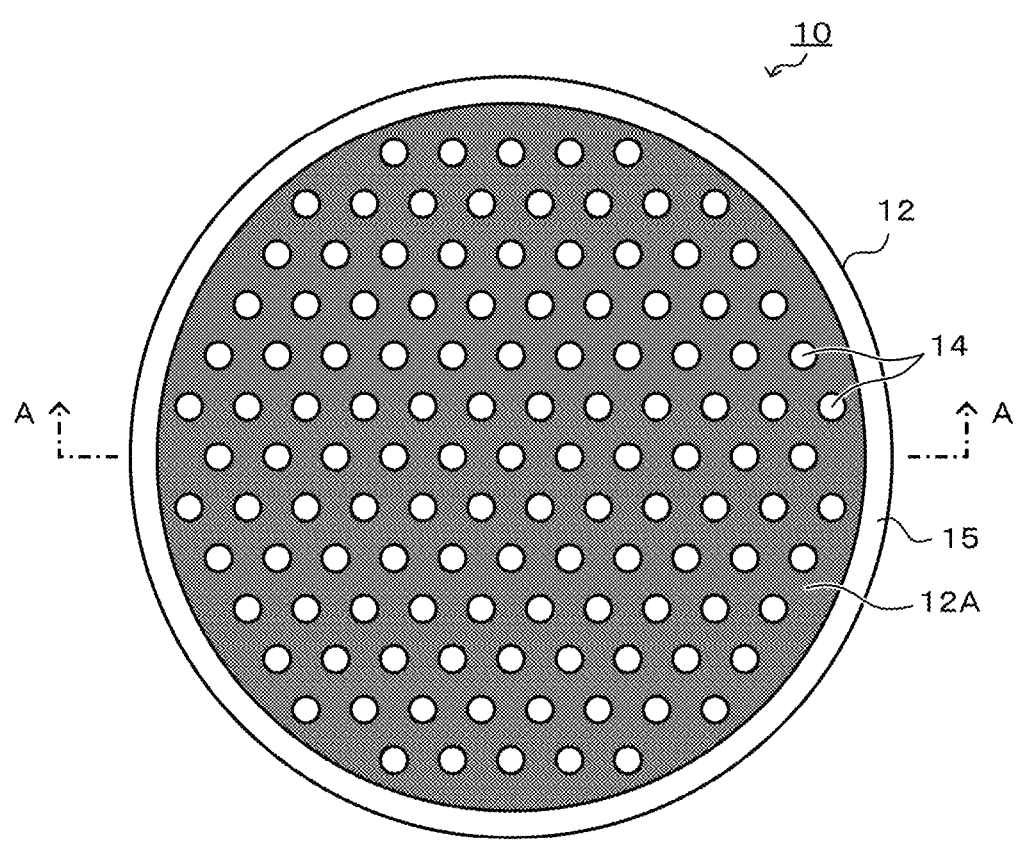
FIG. 1 is a plan view of AlN heater 10.
Figure 2:
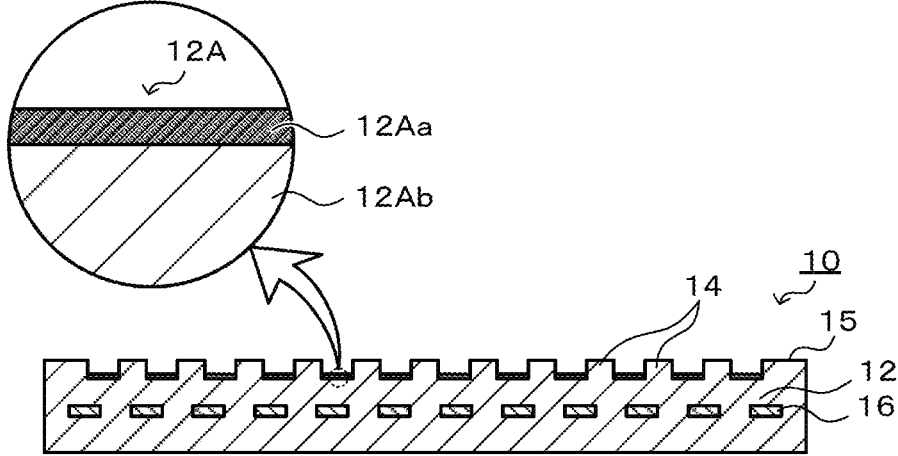
FIG. 2 is a cross-sectional view taken along A-A of FIG. 1.

A preferred embodiment of the present invention will be described below with reference to the drawings. FIG. 1 is a plan view of AlN heater 10, and FIG. 2 is a cross-sectional view taken along A-A of FIG. 1.

In the following description, "upper", "lower" do not represent absolute positional relationship, but represent relative positional relationship. Thus, depending on the orientation of the AlN heater 10, "upper" and "lower" may indicate "lower" and "upper", "left" and "right", or "front"

and "back". Also, "to" indicating a numerical range is used in a sense that the numerical values before and after the "to" are included as a lower limit value and an upper limit value.

The AlN heater 10 in this embodiment is an example of a member for semiconductor manufacturing apparatus of the present invention, and the surface of an AlN ceramic substrate 12 is provided with projections (the small projections 14 and seal band 15) for wafer placement, and an electrode 16 is provided inside the AlN ceramic substrate 12.

The AlN ceramic substrate 12 is a circular sintered body having AlN as the main component. The size of the AlN ceramic substrate 12 is, for example, 200 to 450 mm in diameter, and 10 to 30 mm in thickness. The AlN ceramic substrate 12 may contain a component originated from a sintering aid other than AlN. As the sintering aid for AlN, for example, rare earth metal oxide may be mentioned. As the rare earth metal oxide, for example, $Y_2O_3$ and $Yb_2O_3$ may be mentioned. Note that the "main component" refers to the component occupying 50 volume % or higher (preferably, 70 volume % or higher, more preferably, 85 volume % or higher) or the component having the highest volume ratio among all components (the same applies to the following).

The small projections 14 are a large number of flat cylindrical projections provided at intervals on the entire surface of the AlN ceramic substrate 12. The size of the small projections 14 is, for example, 0.5 to 3 mm in diameter, and 10 to 50 μm in height.

The seal band 15 is an annular projection provided along the outer edge of the AlN ceramic substrate 12 on the surface of the AlN ceramic substrate 12. The seal band 15 is provided to surround a large number of small projections 14. The height of the seal band 15 is the same as the height of the small projections 14.

The electrode 16 is provided inside the AlN ceramic substrate 12 so as to be parallel to the surface of the AlN ceramic substrate 12. In this embodiment, the electrode 16 is a heater electrode. The heater electrode is such that a resistance heating element is wired over the entire AlN ceramic substrate 12 from one end to the other end in a one-stroke pattern when the AlN ceramic substrate 12 is viewed from above. The material for the electrode 16 includes, for example, high melting point metal such as W, Mo, and a carbide of these metals. Note that "parallel" indicates completely parallel as well as not completely parallel within a range of acceptable error (such as a tolerance) but considered to be parallel (the same applies to the following).

An area 12A provided with no projections (the small projections 14 and the seal band 15) of the AlN ceramic substrate 12 has a surface layer region 12Aa from the surface to a predetermined depth, and a base material region 12Ab below the surface layer region 12Aa. The predetermined depth is 5 μm or less (preferably 0.1 to 2.0 μm). The oxygen content rate of the surface layer region 12Aa is preferably higher than or equal to 2.0 times, or more preferably 2.9 times the oxygen content rate of the base material region 12Ab. It is preferable that the surface layer region 12Aa be blackened. It is preferable that no dross be present in the surface layer region 12Aa. The mass ratio O/N of the surface layer region 12Aa is preferably higher than the mass ratio O/N of the base material region 12Ab, more preferably higher than or equal to 2.2 times, further preferably higher than or equal to 3.6 times the mass ratio O/N of the base material region 12Ab. The mass ratio Al/N of the surface layer region 12Aa is preferably higher than or equal to the mass ratio Al/N of the base material region 12Ab, more preferably higher than or equal to 1.1 times, further preferably higher than or equal to 1.2 times the mass ratio Al/N of the base material region 12Ab.

Next, an example of use of the AlN heater 10 will be described. First, the AlN heater 10 is installed in a chamber which is not illustrated. A wafer is then placed on the surface of the AlN heater 10. The wafer is supported by the top surfaces of the large number of small projections 14 and the top surface of the seal band 15. An external heater power supply is connected to the electrode 16 which is a heater electrode to cause a current to flow through the electrode 16. Thus, the electrode 16 generates heat, and the wafer is heated to a predetermined temperature. The space surrounded by the surface layer region 12Aa, the large number of small projections 14, the seal band 15, and the wafer is supplied with heat transfer gas (for example, He gas) from a gas path which vertically penetrates the AlN heater 10 and is not illustrated. In this state, various processes are performed on the wafer. After the processes are completed, the current flow to the electrode 16 ends, and the wafer is removed from the surface of the AlN heater 10.

Figure 3A:
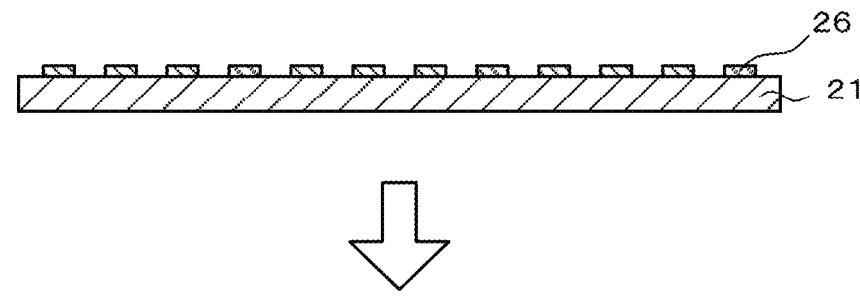
FIGS. 3A to 3D are manufacturing process diagrams for the AlN heater 10.
Figure 3B:
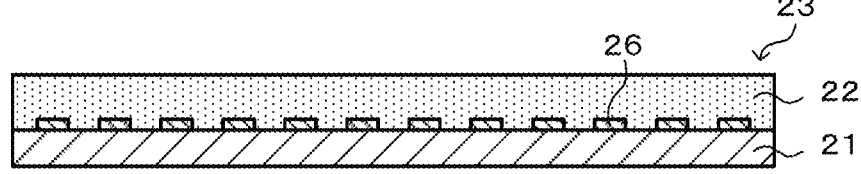
Figure 3C:
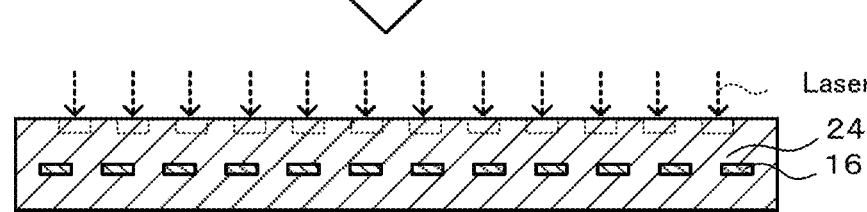

Next, an example of manufacturing of the AlN heater 10 will be described. FIGS. 3A to 3D are manufacturing process diagrams for the AlN heater 10. First, a disc-shaped AlN ceramic sintered body 21 is prepared, and an electrode paste is printed on the upper surface of the AlN ceramic sintered body 21 to create a predetermined electrode pattern, thereby forming a heater electrode precursor 26 (FIG. 3A). The electrode paste is obtained by adding an organic solvent and a binder to powder of mixture of electrode material powder and AlN powder, then mixing and kneading the resulting powder. Subsequently, a disc-shaped AlN ceramic molded body 22 is layered to cover the heater electrode precursor 26 to obtain a layered body 23 (FIG. 3B). Hotpress firing of the layered body 23 causes the heater electrode precursor 26 to be sintered to form the electrode 16 (heater electrode), and the AlN ceramic sintered body 21 and the AlN ceramic molded body 22 between which the heater electrode precursor 26 is interposed are sintered to be integrated, thus an AlN ceramic structure 24 is produced (FIG. 3C).

Figure 3D:
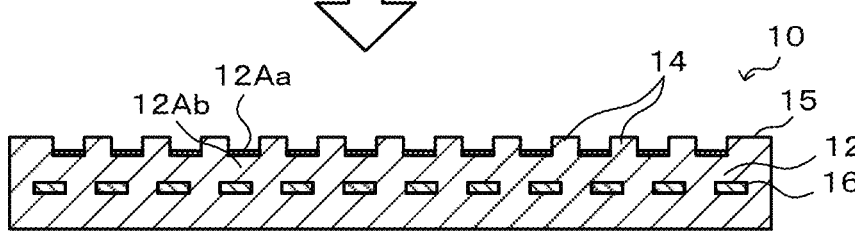

Subsequently, the surface of the AlN ceramic structure 24 is polished to achieve mirror surface finishing, then ablation machining is performed by scanning the surface excluding the area where the small projections 14 and the seal band 15 are formed, with a short-pulsed laser. Consequently, the large number of small projections 14 and the seal band 15 are formed on the surface of the AlN ceramic structure 24. As a result, the AlN ceramic structure 24 becomes the AlN ceramic substrate 12, and the AlN heater 10 is obtained (FIG. 3D). The top surfaces of the large number of small projections 14 and the seal band maintain to be mirrored surfaces. In the ablation machining, material is removed by cutting the interatomic bond, and the portion where the material is removed changes in the crystal structure, and is reformed. Consequently, the oxygen content rate of the surface layer region 12Aa becomes higher than or equal to 2.0 times the oxygen content rate of the base material region 12Ab, and the mass ratio and Al/N of the surface layer region 12Aa have values higher than the mass ratio O/N and Al/N of the base material region 12Ab. The pulse width of the short-pulsed laser is preferably a nanosecond level or less (a pico second level or a femtosecond level). In the ablation machining, the surface which has undergone laser machining increases in hardness due to the reform, thus the occurrence of particles is reduced, and the surface color can be blackened. In addition, in the ablation machining, formation of dross, which causes the occurrence of particles, is reduced, thus the occurrence of particles is reduced, as compared to when dross is formed. Furthermore, in the ablation machining, only the portion which has absorbed laser is removed, thus heat effect on the small projections 14 and the seal band 15 decreases, and the edges of the small projections 14 and the seal band 15 can be made substantially vertical. Thus, even when the small projections 14 and the seal band 15 wear down, the contact area between those and the wafer can be maintained at constant.

In the AlN heater 10 of this embodiment described above, in the area provided with no projections (the small projections 14 and the seal band 15) of the surface of the AlN ceramic substrate 12, the oxygen content rate of the surface layer region 12Aa is higher than or equal to 2.0 times the oxygen content rate of the base material region 12Ab. Thus, the surface layer region 12Aa becomes harder than the base material region 12Ab. Thus, when a wafer is processed, the occurrence of particles can be effectively prevented.

It is preferable that the surface layer region 12Aa be blackened. In this manner, the surface layer region 12Aa is likely to absorb heat, thus radiation heat is likely to be released. Consequently, a uniform wafer temperature is likely to be obtained.

Furthermore, it is preferable that no dross be present in the surface layer region 12Aa. In this manner, dross which may cause the occurrence of particles is not present, thus the occurrence of particles can be prevented more effectively.

Furthermore, the mass ratio O/N of the surface layer region 12Aa is preferably higher than the mass ratio O/N of the base material region 12Ab, more preferably higher than or equal to 2.2 times the mass ratio O/N of the base material region. The mass ratio Al/N of the surface layer region 12Aa is preferably higher than or equal to the mass ratio Al/N of the base material region 12Ab.

Note that the present invention is not limited to the above-described embodiment at all, and obviously can be implemented in various modes as long as the present invention belongs to the technical scope of the present invention.

In the above-described embodiment, a case has been illustrated in which a heater electrode is embedded as the electrode 16 in the AlN ceramic substrate 12, but the embodiment is not particularly limited to this. For example, as the electrode 16, an electrostatic electrode may be embedded, or an RF electrode may be embedded. Alternatively, in addition to the heater electrode, an electrostatic electrode and/or an RF electrode may be embedded.

Figures 4A, 4B, 4C:
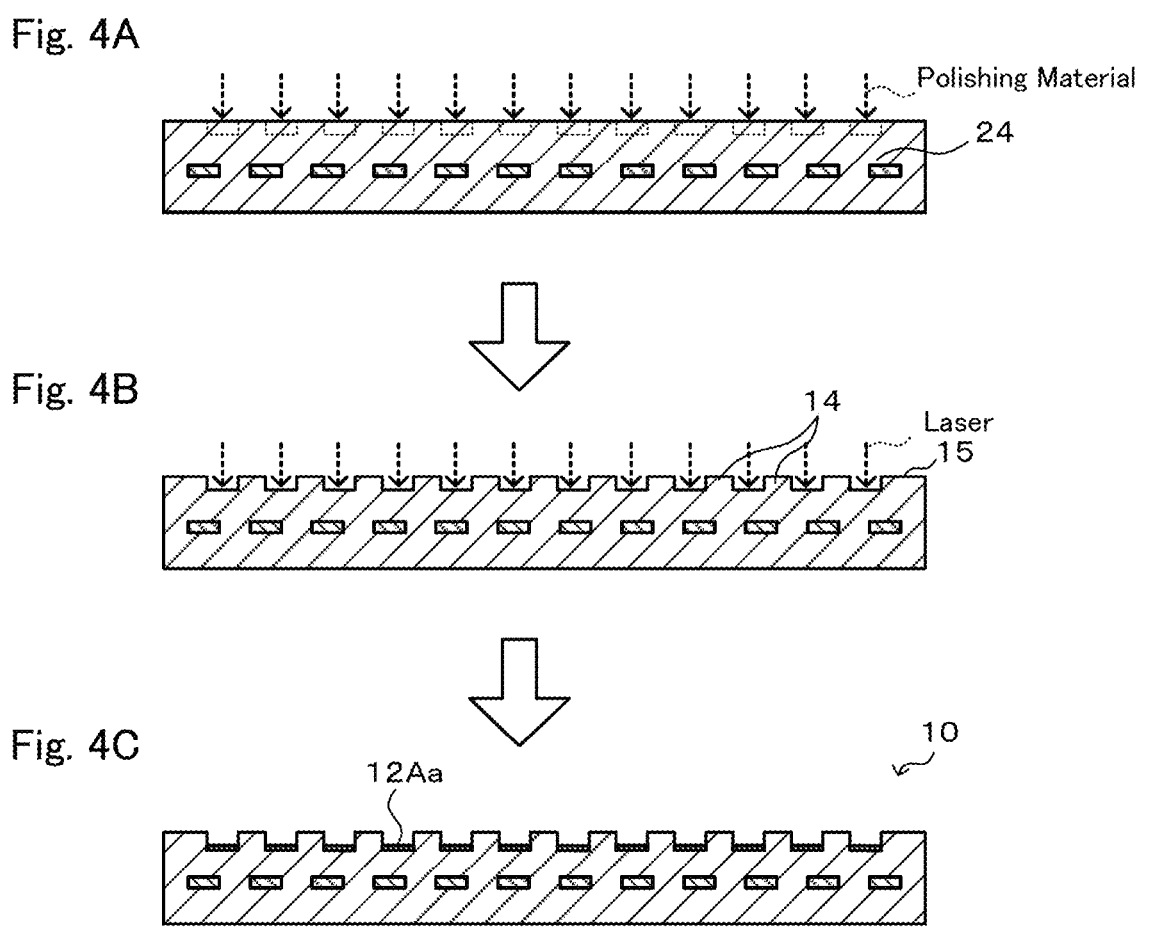
Figures 5A, 5B:
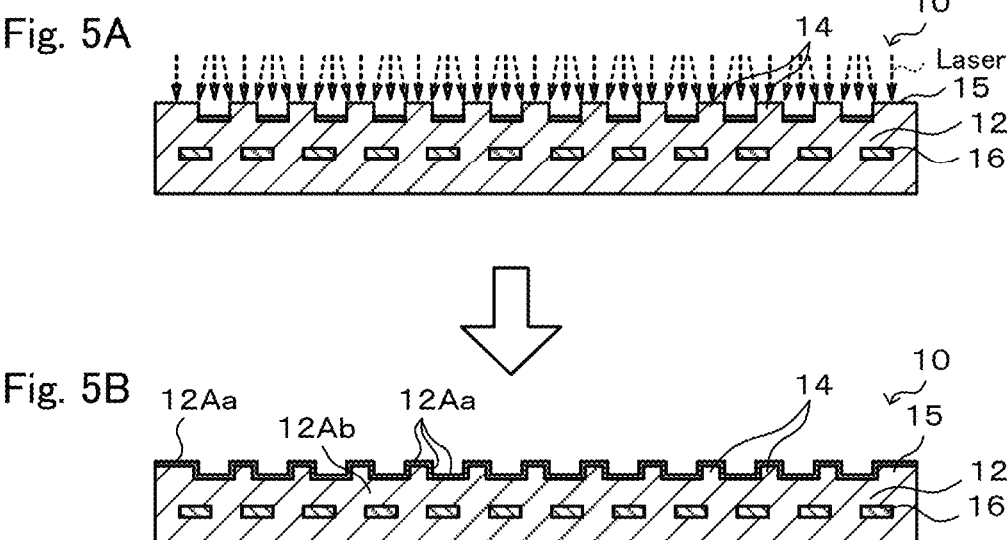
FIGS. 5A and 5B are manufacturing process diagrams for the AlN heater 10.

In the above-described embodiment, the surface of the AlN ceramic structure 24 is polished to achieve mirror surface finishing, then ablation machining is performed by scanning the surface excluding the area where the projections (the small projections 14 and the seal band 15) are formed, with a short-pulsed laser, but the embodiment is not particularly limited to this. For example, after the AlN ceramic structure 24 is produced, before the surface is polished, ablation machining may be performed by scanning the remaining area other than the area where projections are formed, by a short-pulsed laser to form projections, and subsequently, the surfaces of the projections may be polished to achieve mirror surface finishing. Alternatively, instead of making formation of the projections only by a laser, another machining method such as blast machining, and laser machining may be performed in combination. For example, after the AlN ceramic structure 24 is produced, as illustrated in FIG. 4A, the remaining area of the surface other than the area where projections are formed may be polished by blast machining (processing to nail a polishing material to the surface) to form the small projections 14 and the seal band 15 (FIG. 4B), the polished area may be irradiated with a laser to reform the area and form the surface layer region 12Aa, and the AlN heater 10 may be obtained (FIG. 4C). When the top surfaces and/or lateral surfaces of the projections need to be reformed, the top surfaces and/or lateral surfaces of the projections may be irradiated with a laser. For example, ablation machining may be performed by scanning the top surfaces and the lateral surfaces of the small projections 14 and the seal band 15 of the AlN heater 10 by a short-pulsed laser (FIG. 5A), and the surface layer region 12Aa may be formed on the entire surface of the AlN heater 10 including the top surfaces and the lateral surfaces of the small projections 14 and the seal band 15 (FIG. 5B). In that case, it is preferable that the output of the laser be adjusted so that the projections are not eliminated.

In the above-described embodiment, the entire area 12A provided with no projections (the small projections 14 and the seal band 15) of the AlN ceramic substrate 12 has the surface layer region 12Aa and the base material region 12Ab, but the embodiment is not particularly limited to this. For example, part of the area 12A may have the surface layer region 12Aa and the base material region 12Ab. Such a structure is also included in the technical scope of the present invention. When at least part of the area 12A provided with no projections has the surface layer region 12Aa and the base material region 12Ab like this, the structure is included in the technical scope of the present invention, thus the projection portions may have or may not have the surface layer region 12Aa and the base material region 12Ab. For example, at least part of the top surfaces of the projections may have the surface layer region 12Aa and the base material region 12Ab, or the top surfaces of the projections may not have the surface layer region 12Aa and the base material region 12Ab. In addition, at least part of the lateral surfaces of the projections may have the surface layer region 12Aa and the base material region 12Ab, or the lateral surfaces of the projections may not have the surface layer region 12Aa and the base material region 12Ab.

EXAMPLES

Hereinafter, Examples of the present invention will be described. Note that the following Examples do not limit the present invention at all.

Reference Example 1

A disc-shaped AlN ceramic substrate (base material A, 320 mm in diameter, 20 mm in thickness) including no electrode was produced in the following manner. First, a ceramic slurry precursor was obtained by mixing 100 parts by mass of aluminum nitride powder (purity of 99.7%), 5 parts by mass of yttrium oxide, 2 parts by mass of a dispersant (polycarboxylic acid-based copolymer), and 30 parts by mass of a dispersant (polybasic acid ester) for 14 hours using a ball mill (trommel). Then 4.5 parts by mass of isocyanate (4, 4'-diphenyl methane diisocyanate), 0.1 parts by mass of water, and 0.4 parts by mass of a catalyst (6-dimethylamino-1-hexanol) were added to and mixed with the ceramic slurry precursor, thus a ceramic slurry was obtained. The ceramic slurry is poured into a mold having a disc-shaped internal space, an organic binder (urethane resin) was generated by a chemical reaction between the isocyanate and the water, then a hardened molded body was taken out from the mold. The molded body was dried for 10 hours at 100° C., and degreased and calcined under a hydrogen atmosphere at a maximum temperature of 1300° C. to obtain a ceramic calcined body. The ceramic calcined body was hot-press fired for six hours at 1860° C. in a nitrogen gas with a press pressure of 250 kgf/cm², thus an AlN ceramic substrate was produced. The mass % of N, O, Al, Y was determined by EDX analysis on the obtained AlN ceramic substrate. In addition, the color of the AlN ceramic substrate was visually measured, and the hardness was measured by Micro-Vickers Hardness Tester HM-211 manufactured by Mitutoyo. Those results are shown in Table 1.

Example 1

The surface of the base material A was processed by ablation machining by utilizing a picosecond laser processing machine. The picosecond laser processing machine performed ablation machining by scanning the substrate surface at intervals of 5 μm in parallel, while driving the motor of the galvano mirror and the motor of the stage. The machining wavelength, scanning speed, pulse width and laser output were set to the values shown in Table 1, and the frequency was set to 200 kHz. The number of machining processes was 2. After the machining processes, the cross section of the AlN ceramic substrate was checked, and the cross section was found to be divided into the surface layer region (the blackened and reformed region up to 0.5 μm from the surface), and the base material region below the surface layer region. For the surface layer region, the mass % of each of N, O, Al, Y was determined in the same manner as for the base material A. In addition, the ratio of the oxygen content rate of the surface layer region to the oxygen content rate of the base material region, the ratio of the mass ratio O/N of the surface layer region to the mass ratio O/N of the base material region, and the ratio of the mass ratio Al/N of the surface layer region to the mass ratio Al/N of the base material region were determined. Furthermore, the color and the hardness of the surface layer region were measured in the same manner as for the base material A. Those results are shown in Table 1. The hardness of the surface layer region was 670 Hv, which was approximately 1.28 times the hardness (523 Hv) of the base material region. Since the hardness of the surface layer region in Example 1 is greater than the hardness of the base material A (Reference Example 1), the particle prevention effect is improved as compared to the base material A. When the surface layer region in Example 1 was observed by a scanning electron microscope (SEM), dross was not found. Thus, the particle prevention effect is improved as compared to PTL 1.

Reference Example 2

A disc-shaped AlN ceramic substrate (base material B) in the same size as the base material A was produced by the same method as for the base material A. For the obtained AlN ceramic substrate, the mass % of each of N, O, Al, Y was determined in the same manner as for the base material A. For the base material B, a lot different from that of the base material A is used, thus the mass % of each element is different. The color and the hardness of the AlN ceramic substrate were measured in the same manner as for the base material A. Those results are shown in Table 1.

Examples 2 to 4

The surface of the base material B was processed by ablation machining by utilizing a nanosecond laser processing machine. The nanosecond laser processing machine performed ablation machining by scanning the substrate surface at intervals of 5 μm in parallel, while driving the motor of the galvano mirror and the motor of the stage. In Examples 2 to 4, the machining wavelength, scanning speed, pulse width and laser output were set to the values shown in Table 1, the frequency was set to 50 kHz, and the number of machining processes was 1. After the machining process, the cross section of the AlN ceramic substrate was checked, and the cross section was found to be divided into the surface layer region, and the base material region below the surface layer region. The surface layer region in Example 2 was the region up to 0.2 μm from the surface, the surface layer region in Example 3 was the region up to 0.3 μm from the surface, and the surface layer region in Example 4 was the region up to 0.2 μm from the surface. For the surface layer region in each of Examples 2 to 4, the mass % of each of N, O, Al, Y was determined in the same manner as for the base material A. In addition, the ratio of the oxygen content rate of the surface layer region to the oxygen content rate of the base material region, the ratio of the mass ratio O/N of the surface layer region to the mass ratio O/N of the base material region, and the ratio of the mass ratio Al/N of the surface layer region to the mass ratio Al/N of the base material region were determined. Furthermore, the color and the hardness of the surface layer region were measured in the same manner as for the base material A. Those results are shown in Table 1. The hardness of the surface layer region was 650 to 690 Hv, which was approximately 1.16 to 1.23 times the hardness (560 Hv) of the base material region. Since the hardness of the surface layer region in each of Examples 2 to 4 is greater than the hardness of the base material B (Reference Example 2), the particle prevention effect is improved as compared to the base material B. When the surface layer region in each of Examples 2 to 4 was observed by a scanning electron microscope (SEM), dross was not found. Thus, the particle prevention effect is improved as compared to PTL 1.

Reference Example 3

A disc-shaped AlN ceramic substrate (base material C) in the same size as the base material A was produced by the same method as for the base material A. For the obtained AlN ceramic substrate, the mass % of each of N, O, Al, Y was determined in the same manner as for the base material A. For the base material C, a lot different from that of the base material A is used, thus the mass % of each element is different. The color and the hardness of the AlN ceramic substrate were measured in the same manner as for the base material A. Those results are shown in Table 1.

Examples 5, 6

The surface of the base material C was processed by ablation machining by utilizing a picosecond laser processing machine. The picosecond laser processing machine performed ablation machining by scanning the substrate surface at intervals of 5 μm in parallel, while driving the motor of the galvano mirror and the motor of the stage. In Examples 5, 6, the machining wavelength, scanning speed, pulse width and laser output were set to the values shown in Table 1, the frequency was set to 200 kHz, and the number of machining processes was 1. After the machining process, the cross section of the AlN ceramic substrate was checked, and the cross section was found to be divided into the surface layer region, and the base material region below the surface layer region. The surface layer regions in Examples 5, 6 are each region up to 0.5 μm from the surface. For the surface layer region in each of Examples 5, 6, the mass % of each of N, O, Al, Y was determined in the same manner as for the base material A. In addition, the ratio of the oxygen content rate of the surface layer region to the oxygen content rate of the base material region, the ratio of the mass ratio O/N of the surface layer region to the mass ratio O/N of the base material region, and the ratio of the mass ratio Al/N of the surface layer region to the mass ratio Al/N of the base material region were determined. Furthermore, the color and the hardness of the surface layer region were measured in the same manner as for the base material A. Those results are shown in Table 1. The hardness of the surface layer region was 459.9 to 635.9 Hv, which was approximately 1.11 to 1.54 times the hardness (413 Hv) of the base material region. Since the hardness of the surface layer region in each of Examples 5, 6 is greater than the hardness of the base material C, the particle prevention effect is improved as compared to the base material C. When the surface layer region in each of Examples 5, 6 was observed by a scanning electron microscope (SEM), dross was not found. Thus, the particle prevention effect is improved as compared to PTL 1.

10 the predetermined depth is 5 μm or less, and an oxygen content rate of the surface layer region is higher than an oxygen content rate of the base material region, and wherein a nitrogen content rate of the surface layer region is lower than a nitrogen content rate of the base material region.

2. The member for semiconductor manufacturing apparatus according to claim 1, wherein an oxygen content rate of the surface layer region is higher than or equal to 2.0 times an oxygen content rate of the base material region.

3. The member for semiconductor manufacturing apparatus according to claim 1, wherein the surface layer region is blackened.

4. The member for semiconductor manufacturing apparatus according to claim 1, wherein dross is not present in the surface layer region.

5. The member for semiconductor manufacturing apparatus according to claim 1, wherein a mass ratio O/N of the surface layer region has a value higher than a mass ratio O/N of the base material region.

TABLE 1

| | Laser Processing Condition | | | | Content Rate [mass %] | | | | Ratio | | | Characteristic | |
| | Machining Wavelength (nm) | Machining Speed (mm/s) | Pulse Width | Output (W) | N | O | Al | Y | O*1 | O/N*2 | Al/N*3 | Color | Hardness (Hv) |
|---|---|---|---|---|---|---|---|---|---|---|---|---|---|
| Reference Example 1 (Base Material A) | — | — | — | — | 38.8 | 5.6 | 42.9 | 5.6 | — | — | — | Milky White | 523 |
| Example 1 | 1030 | 2000 | Picosecond | 40 | 17.9 | 18.4 | 55.9 | 0.0 | 3.3 | 7.1 | 2.8 | Black | 670 |
| Reference Example 2 (Base Material B) | — | — | — | — | 33.3 | 3.0 | 58.0 | 5.7 | — | — | — | Milky White | 560 |
| Example 2 | 355 | 200 | Nanosecond | 0.5 | 27.3 | 8.7 | 58.7 | 5.3 | 2.9 | 3.6 | 1.2 | Black | 682 |
| Example 3 | 355 | 500 | Nanosecond | 0.5 | 26.8 | 8.6 | 59.3 | 5.3 | 2.9 | 3.6 | 1.3 | Black | 690 |
| Example 4 | 355 | 1000 | Nanosecond | 0.5 | 29.9 | 5.9 | 59.5 | 4.7 | 2.0 | 2.2 | 1.1 | Black | 650 |
| Reference Example 3 (Base Material C) | — | — | — | — | 34.1 | 4.5 | 50.9 | 3.1 | — | — | — | Milky White | 413.1 |
| Example 5 | 515 | 800 | Picosecond | 27 | 22.1 | 24.0 | 35.4 | 0.5 | 5.4 | 8.3 | 1.1 | Black | 459.9 |
| Example 6 | 515 | 500 | Picosecond | 15 | 19.6 | 19.2 | 41.1 | 1.5 | 4.3 | 7.5 | 1.4 | Black | 635.9 |

Figure 6:
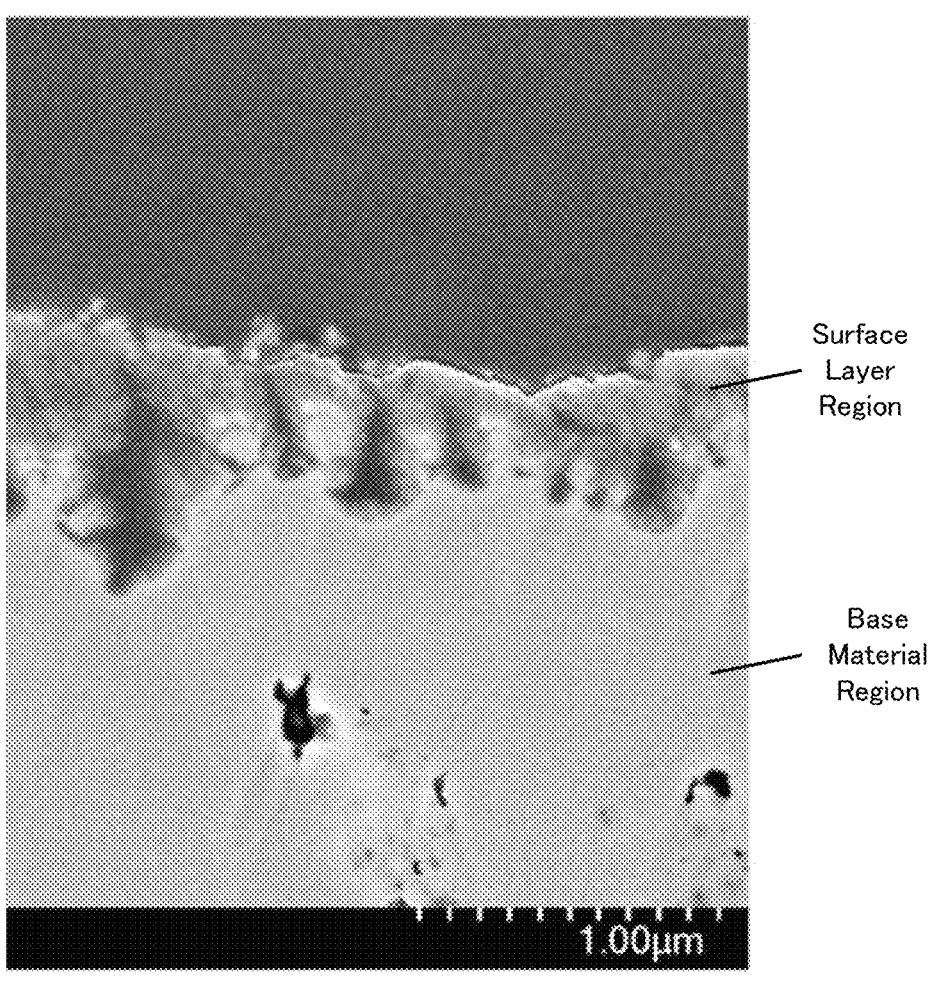
FIG. 6 is an enlarged image of a cross section of an AlN ceramic substrate in Example 1.
Figure 7:
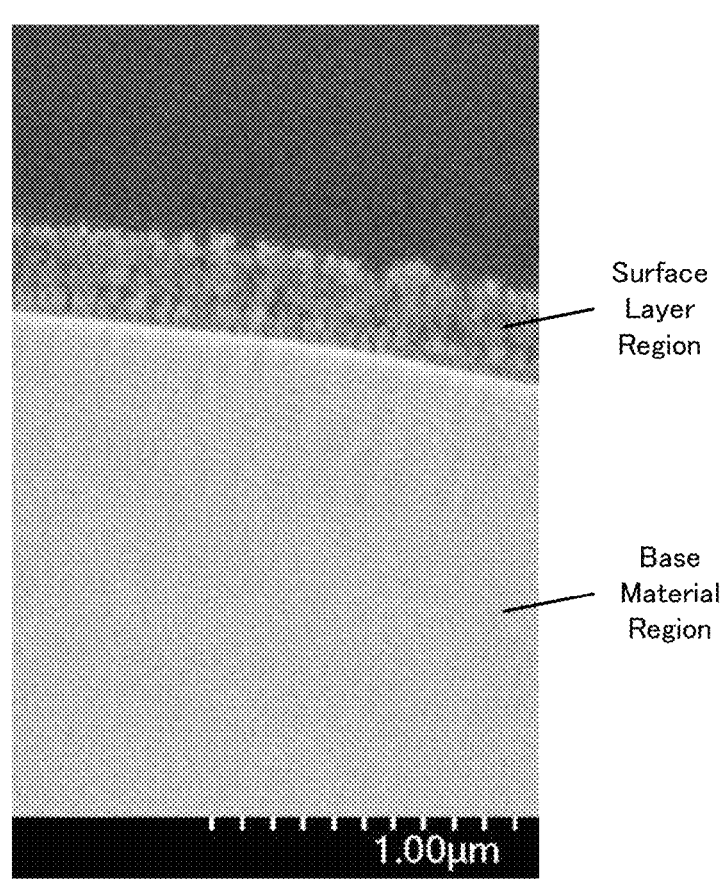
FIG. 7 is an enlarged image of a cross section of an AlN ceramic substrate in Example 2.

*1 Ratio of oxygen content rate of surface layer region to oxygen content rate of base material region
*2 Ratio of mass ratio O/N of surface layer region to mass ratio O/N of base material region
*3 Ratio of mass ratio Al/N of surface layer region to mass ratio Al/N of base material region FIG. 6 is an enlarged image of a cross section of the AlN ceramic substrate in Example 1, and FIG. 7 is an enlarged image of a cross section of the AlN ceramic substrate in Example 2. In FIG. 6 and FIG. 7, the length of the entire scale (10 scale marks) is 1.00 μm.

The present application claims priority of Japanese Patent Application No. 2022-055112 filed on Mar. 30, 2022, the entire contents of which are incorporated herein by reference. International Application No. PCT/JP2022/038413, filed on Oct. 14, 2022, is incorporated herein by reference in its entirety.

What is claimed is:

1. A member for semiconductor manufacturing apparatus, including an AlN ceramic substrate with a surface provided with projections for wafer placement, wherein at least part of an area, provided with no projection, of the AlN ceramic substrate has a surface layer region from the surface to a predetermined depth, and a base material region below the surface layer region, 6. The member for semiconductor manufacturing apparatus according to claim 5, wherein the mass ratio O/N of the surface layer region is higher than or equal to 2.2 times the mass ratio O/N of the base material region.

7. The member for semiconductor manufacturing apparatus according to claim 1, wherein a mass ratio Al/N of the surface layer region has a value higher than a mass ratio Al/N of the base material region.

8. The member for semiconductor manufacturing apparatus according to claim 7, wherein the mass ratio Al/N of the surface layer region is higher than or equal to 1.1 times the mass ratio Al/N of the base material region.

9. The member for semiconductor manufacturing apparatus according to claim 1,

wherein the area, provided with no projection, of the AlN ceramic substrate has the surface layer region and the base material region.

\* \* \* \* \*